(12) United States Patent
Fujishita

(10) Patent No.: US 7,206,648 B2
(45) Date of Patent: Apr. 17, 2007

(54) MULTI-CHANNEL AUDIO REPRODUCING APPARATUS

(75) Inventor: Kaneaki Fujishita, Chiba (JP)

(73) Assignee: Sony Corporation (JP)

( * ) Notice: Subject to any disclaimer, the term of this patent is extended or adjusted under 35 U.S.C. 154(b) by 1048 days.

(21) Appl. No.: 09/875,399

(22) Filed: Jun. 6, 2001

(65) Prior Publication Data
US 2002/0006081 A1    Jan. 17, 2002

(30) Foreign Application Priority Data
Jun. 7, 2000  (JP) .......................... P2000-170501

(51) Int. Cl.
G06F 17/00 (2006.01)
H04B 1/00 (2006.01)
H04B 1/20 (2006.01)

(52) U.S. Cl. ............................. 700/94; 381/119; 369/4
(58) Field of Classification Search .................. 381/21, 381/303, 119; 700/94; 369/1–5
See application file for complete search history.

(56) References Cited
U.S. PATENT DOCUMENTS 5,029,005 A * 7/1991 Morris, Jr. .................. 348/632
5,896,358 A * 4/1999 Endoh et al. .................. 369/89
5,912,976 A * 6/1999 Klayman et al. ............. 381/18
6,442,278 B1 * 8/2002 Vaudrey et al. ............... 381/27

* cited by examiner

Primary Examiner—Sinh Tran
Assistant Examiner—Andrew C Flanders
(74) Attorney, Agent, or Firm—Lerner, David, Littenberg, Krumholz & Mentlik, LLP

(57) ABSTRACT

A multi-channel audio reproducing apparatus includes several audio power amplifiers, the number of which is less than the number of channels required for the multi-channel format of the input audio signals. The multichannel audio reproducing apparatus also includes a decoder for decoding input audio signals and a signal processor, arranged between the decoder and the audio power amplifiers, for receiving decoder output signals of a plurality of channels of the multi-channel format at the input channels thereof and for outputting, at the output channels thereof, audio signals of channels of a number less than the number of audio power amplifiers. A controller controls the signal processor in response to setting information of the connection and installation of a plurality of speakers to which the outputs of the audio power amplifiers are respectively supplied.

9 Claims, 5 Drawing Sheets

MULTI-CHANNEL AUDIO REPRODUCING APPARATUS

BACKGROUND OF THE INVENTION

1. Field of the Invention

The present invention relates to an audio reproducing apparatus for reproducing audio signals in a multi-channel audio format of a DVD (Digital Versatile Disc), such as AC-3 (Audio Code Number 3) or dts (digital theater system).

2. Description of the Related Art

Multi-channel audio formats are employed as the DVD video audio format, and 5.1 channels such as the AC-3 and dts are well known. According to the definition of such a 5.1 channel multi-channel surround system, there are employed two from left and from right channels, a front center single channel, two rear left and rear right channels and a sub woofer channel.

A multi-channel audio reproducing apparatus such as an AV (Audio visual) amplifier (A/V receivers) for reproducing a surround signal requires a maximum number of audio power amplifiers defined by the audio format. The multi-channel audio apparatus based on the 5.1 channel surround typically includes five audio power amplifiers (if no power amplifier is provided for the woofer).

A 6.1 channel audio format with a rear center extended to three channels, such as THX-EX and dts-ES, has been standardized as a multi-channel surround method.

The conventional technique based on the assumption that audio power amplifiers of the maximum number defined by the audio format are included needs modifying hardware to include six audio power amplifiers in a multi-channel audio reproducing apparatus for 6.1 channels.

However, in the method requiring power amplifiers of the number equal to the number of channels of audio format, each time the number of channels is increased, power amplifiers must be added accordingly. This method not only increases the additional cost of expensive high-power amplifiers but also assembly costs involved in the modification of hardware. The reproducing apparatus becomes costly.

SUMMARY OF THE INVENTION

Accordingly, it is an object of the present invention to provide an audio reproducing apparatus that copes with the increase in the number of channels of multi-channel surround system.

In one aspect, a multi-channel audio reproducing apparatus of the present invention includes a decoder for decoding input audio signals in a predetermined multi-channel format, a plurality of audio power amplifiers, the number of which is smaller than the number of channels required for a multi-channel format for the input audio signals, a signal processor, arranged between the decoder and the plurality of audio power amplifiers, for receiving, at the input channels thereof, decoder outputs of a plurality of channels in the multi-channel format from the decoder and for outputting, at the output channels thereof, audio signals of the number of channels equal to or smaller than the number of the plurality of audio power amplifiers, a user interface means for receiving user setting information about at least one of the connection and the installation of a plurality of speakers to which outputs of the plurality of audio power amplifiers are respectively provided, and a controller for controlling the signal processor in response to the user setting information, received by the user interface means, of at least one of the connection and the installation of the plurality of speakers.

In the reproducing apparatus, the controller controls the signal processor in accordance with the information of the connection/installation of the speakers. The signal processor establishes a correspondence between the decoded audio outputs of the input channels and the speakers that are actually installed and connected. When the decoded audio output of the input channel with the corresponding speaker thereof neither installed nor connected is mixed with another channel signal. In this way, the reproducing apparatus provides the audio output signal of the output channel corresponding to the actually installed and/or connected speaker.

In a preferred embodiment, the signal processor outputs output signals of the output channels of the number responsive to the number of speakers, which are actually connected and/or installed, in accordance with the user setting information of the speakers.

In the reproducing apparatus, the signal processor mixes the decoded audio outputs of the input channels, thereby forming the audio output signals of the output channels of the number responsive to the number of the speakers that are actually installed and/or connected.

In a preferred embodiment, the controller controls the signal processor in accordance with the user setting information of the connection and the installation of the speakers so that the decoder output of the input channel from among the input channels, the corresponding speaker of which is determined to be connected and/or installed, is output to the corresponding output terminal, and so that the decoder output of the input channel, the corresponding speaker of which is determined to be unconnected and/or uninstalled, is mixed with the decoder output of another input channel with the corresponding speaker thereof connected and/or installed.

In the reproducing apparatus, the controller controls the signal processor in accordance with the user setting information of the connection and/or the installation of the speakers so that the decoder output of the input channel, the corresponding speaker of which is determined to be unconnected and/or uninstalled, is mixed with the decoder output of another input channel with the corresponding speaker thereof connected and/or installed. The decoder output of the input channel with the corresponding speaker thereof connected and/or installed is output to the corresponding output terminal.

In a preferred embodiment, the controller controls the signal processor in accordance with the user setting information of the speakers so that the decoder output of the input channel from among the input channels, the corresponding speaker of which is determined to be unconnected and/or uninstalled, is mixed with the decoder output of another input channel with the corresponding speaker thereof connected and/or installed, and so that the output of the decoder output of another input channel with the corresponding speaker thereof connected, is supplied to the output channel which becomes available as a result of the mixing.

In the reproducing apparatus, in accordance with the user setting information of the speakers, the decoder output of the input channel from among the input channels, the corresponding speaker of which is determined to be unconnected and/or uninstalled, is mixed with the decoder output of another input channel with the corresponding speaker thereof connected and/or installed. When it is determined that no speaker is connected and/or installed, the output of the decoder output of another input channel with the corresponding speaker thereof connected, is supplied to the output channel which becomes available as a result of the mixing.

The reproducing apparatus works in a new audio format multi-channel surround having an increased number of channels without the need for modifying the existing hardware of the reproducing apparatus having a smaller number of channels.

The above-referenced reproducing apparatus is particularly useful when the following multi-channel surround system is used in a manner to be discussed below.

Specifically, there are times when a user does not use all of speakers in accordance with the audio format in the actual construction of a multi-channel surround system for space availability or other reasons. For example, installation space for a speaker of a front center channel may be occupied by an image display device such as a television receiver, and no front center channel speaker is practically installed. The reproducing apparatus is frequently set up without the front center speaker. The same is true of the speaker system to be mounted in an automobile. The front center speaker cannot be mounted. The present invention is particularly advantageous when the speakers cannot be increased in number and cannot be installed in a standard layout in accordance with standard audio format.

The amplifier for the channel corresponding to an actually uninstalled speaker remains unused. In the reproducing apparatus of this invention, however, a conventionally unused channel is assigned to a channel for a newly added audio format in accordance with the setting information of speaker arrangement.

DESCRIPTION OF THE PREFERRED EMBODIMENTS

Figure 1:
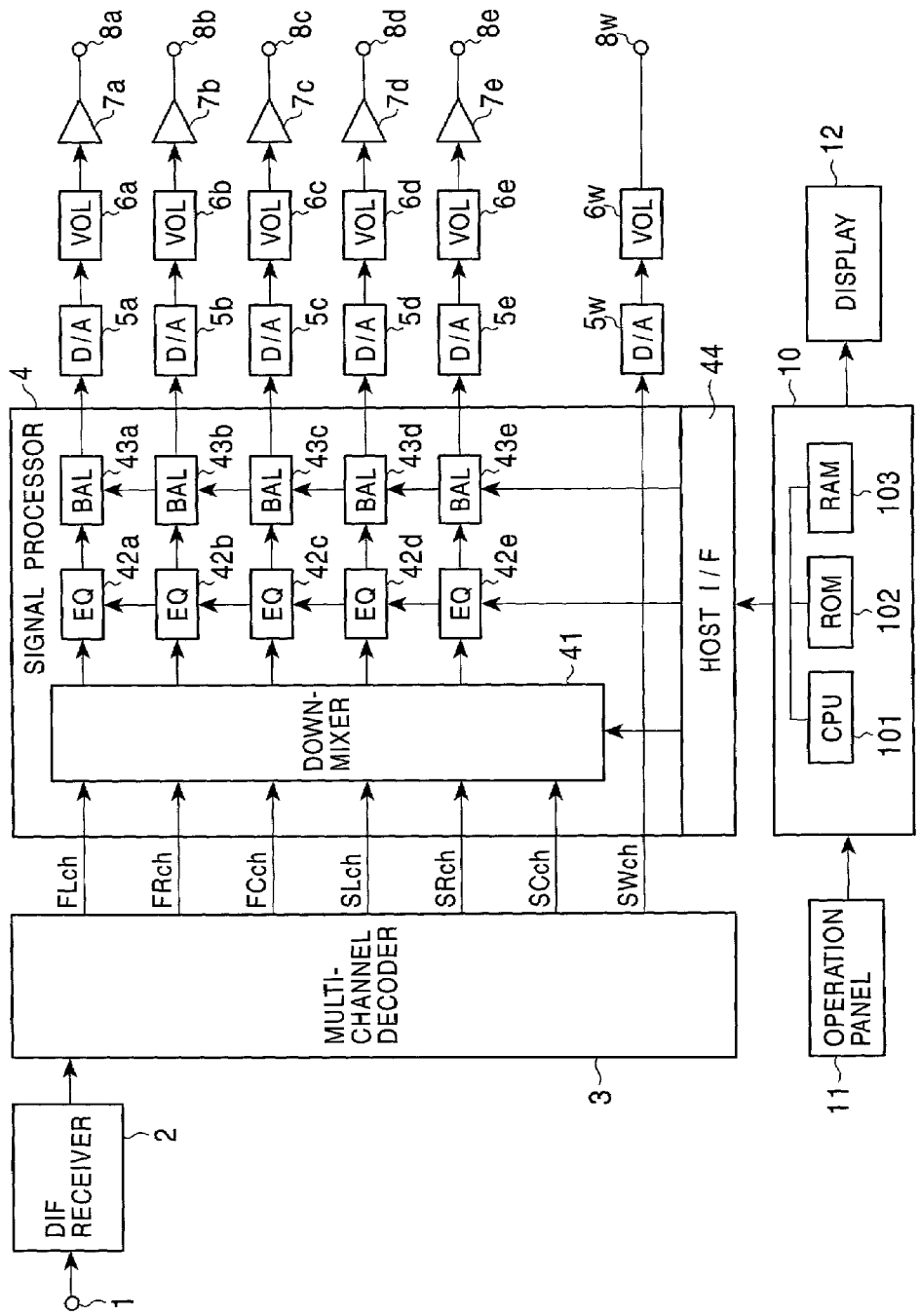
FIG. 1 is a block diagram showing one embodiment of the multi-channel audio reproducing apparatus of the present invention.

One embodiment of the multi-channel audio reproducing apparatus of the present invention is discussed, referring to the drawings. The embodiment to be discussed here employs an AV (Audio Visual) amplifier that works with 6.1 channels without the need for modifying the hardware structure for 5.1 channels.

A bi-phase-modulated, compressed audio signal of THX-EX 6.1 channels is input to the AV amplifier of this embodiment through an input terminal 1. The AV amplifier receives the input signal at a digital interface (DIF) receiver 2 and decodes the input signal into multi-channel audio outputs of six channels plus a sub woofer channel in a multi-channel decoder 3 composed of a DSP (Digital Signal Processor).

The multi-channel decoded outputs of the multi-channel decoder 3 shown in FIG. 1 include six channels of a front left channel FLch, a front right channel FRch, a front center channel FCch, a rear left channel SLch, a rear right channel SRch, and a rear center channel SCch, and a sub woofer channel SWch.

The multi-channel decoded outputs from the multi-channel decoder 3 are input to a signal processor 4. The signal processor 4 includes a down-mixer 41, equalizer circuits 42a, 42b, 42c, 42d, and 42e for five channels, balance adjustment circuits 43a, 43b, 43c, 43d, and 43e for the five channels, and a host interface 44.

The five channel outputs from the signal processor 4 are respectively converted into analog audio signals by D/A converters 5a, 5b, 5c, 5d, and 5e. The analog audio signals for the channels are subjected to volume adjustment in volume controllers 6a, 6b, 6c, 6d, and 6e, and then fed to audio power amplifiers 7a, 7b, 7c, 7d, and 7e, and output to output terminals 8a, 8b, 8c, 8d, and 8e.

A digital audio signal for the sub woofer channel is converted into an analog audio signal by a D/A converter 5w, and is then output to an output terminal 8w through a volume controller 6w. Since the sub woofer includes an audio power amplifier in this embodiment, the AV amplifier includes no audio power amplifier for the sub woofer.

The user appropriately connects speakers for respective output terminals 8a, 8b, 8c, 8d, 8e, and 8w. As already discussed, not all terminals 8a, 8b, 8c, 8d, 8e, and 8w are connected to their respective speakers.

The down-mixer 41 in the signal processor 4 receives six channel decoder outputs as input channels from the multi-channel decoder 3 except the sub woofer channel SWch. As will be discussed later, the decoder output of an input channel assigned to an actually uninstalled speaker is assigned to an input channel having a speaker assigned thereto. The output channel signals are thus formed in accordance with the actual speaker layout. In this case, the maximum number of output channels is five channels.

The down-mixer 41 has the function of mixing decoder outputs of a plurality of channels and the function of switching decoder outputs of a plurality of channels as one of output channels. The down-mixer 41 is controlled by a control signal from a controller 10 including a micro computer.

The controller 10 includes a CPU 101, a program ROM (Read Only Memory) 102, and a working memory RAM (Random Access Memory) 103, and receives user input through an operation panel 11 through an unshown interface. The controller 10 controls display on a display 12 such as an LCD (Liquid-Crystal Display) through a display controller (not shown).

As will be discussed later, using the operation panel 11, the user inputs the relationship between actually connected speakers of the usable speakers in an input audio format 6.1 channel surround system and the output terminals 8a, 8b, 8c, 8d, 8e, and 8w as setting information of the layout of the speakers.

Based on the setting information of the layout of the speakers, the controller 10 generates a control signal for controlling the down-mixer 41, and supplies the signal processor 4 with the control signal through the host interface 44. In response to the control signal, the down-mixer 41 mixes the output of the decoder 3 of an input channel having no corresponding speaker installed and/or connected thereto with the decoder output of another input channel having the corresponding speaker connected thereto. The down-mixer 41 performs down-mixing so that the decoder output of an input channel having the corresponding speaker connected thereto becomes an output channel signal set in accordance with the setting information of the speaker installation.

The operation of the AV amplifier as the embodiment of the multi-channel reproducing apparatus thus constructed is discussed.

The user selects actually connecting speaker(s) from among the usable channel speakers in the 6.1 channel surround system, and respectively connects the speakers of the selected channels to the output terminals 8a, 8b, 8c, 8d, 8e, and 8w while installing the speakers at the appropriate locations thereof.

The user sets up the AV amplifier through the operation panel 11, monitoring a guidance provided on the screen of a television receiver monitor to which the video output of the AV amplifier is supplied. The setup screen may be presented on the display 12.

Setup items include setting information of the connection and/or installation of the speakers, indicating which channel speaker is installed and which speaker is connected to the respective output terminal.

In the AV amplifier of this embodiment, default setting information of the speakers indicates that the output terminal 8a is connected to the front left channel FLch, that the output terminal 8b is connected to the front right channel FRch, that the output terminal 8c is connected to the front center channel FCch, that the output terminal 8d is connected to the rear left channel SLch, that the output terminal 8e is connected to the rear right channel SRch, and that the output terminal 8w is connected to the sub woofer channel SWch.

The user may modify the default setting information of the speakers or may leave the default setting information intact. The controller 10 recognizes the setting information of the speaker layout input through the operation panel 11, and generates, in response to the recognition result, a control signal that controls the down-mixing operation of the down-mixer 41 in the signal processor 4. The generated control signal is fed to the down-mixer 41 through the host interface 44. The down-mixer 41 performs the down-mixing process in response to the control signal.

Figure 2:
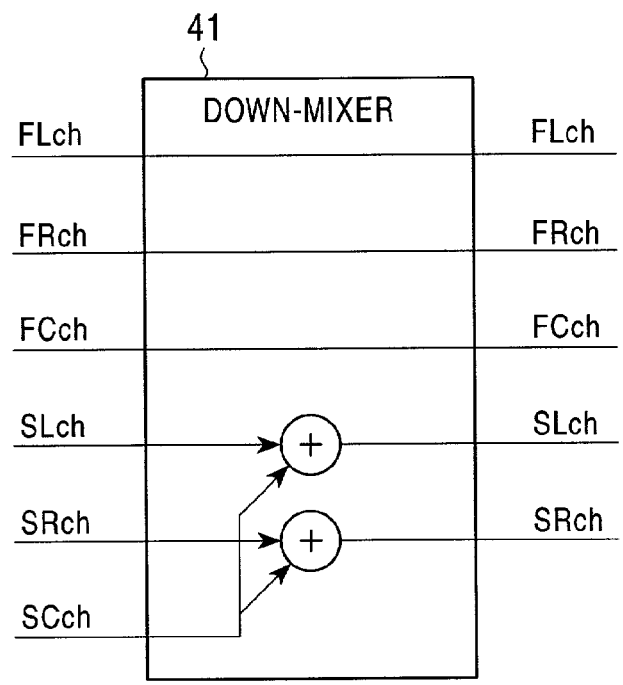
FIG. 2 shows the process of a down-mixer of a signal processor of the embodiment of the present invention.

When the user performs the same setting as the default setting of the speaker layout, the controller 10 supplies the down-mixer 41 with the control signal that mixes the signal of the rear center channel SCch of the input channel with each of the signal of the rear left channel SLch and the signal of the rear right channel SRch. The down-mixer 41 outputs five output channels as shown in FIG. 2.

Figure 3:
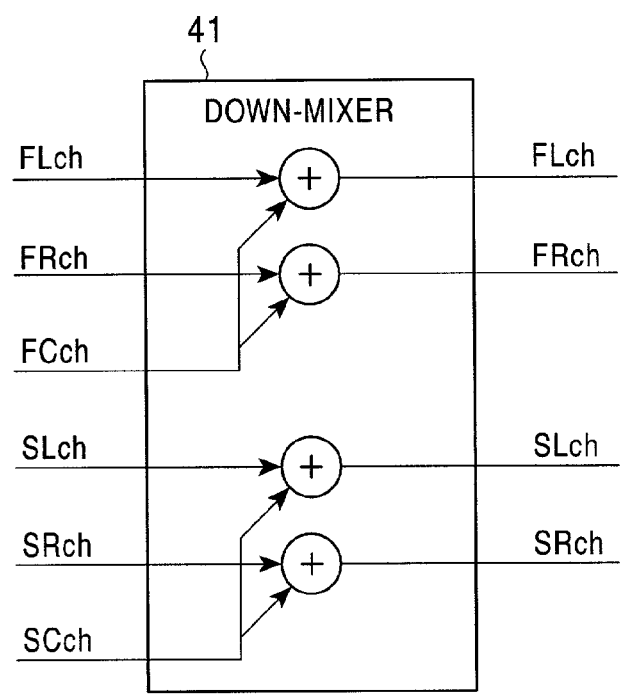
FIG. 3 shows the process of the down-mixer of the signal processor of the embodiment of the present invention.

The user may not install the speakers for the front center channel FCch and the rear center channel SCch, and sets up the remaining channels as defaulted. As shown in FIG. 3, the controller 10 supplies the down-mixer 41 with a control signal for mixing the signal of the rear center channel SCch of the input channels with each of the signal of the rear left channel SLch and the signal of the rear right channel SRch, and for mixing the signal of the front center channel FCch with each of the signal of the front left channel FLch and the signal of the front right channel FRch. The down-mixer 41 outputs the four output channel signals as shown in FIG. 3.

When not all of the output channels are used as shown in FIG. 3, the controller 10 recognizes unused channels in this embodiment. The controller 10 then cuts off power to the D/C converter, the volume controller, and the audio power amplifier for the unused channel, thereby reducing power consumption.

Figure 4:
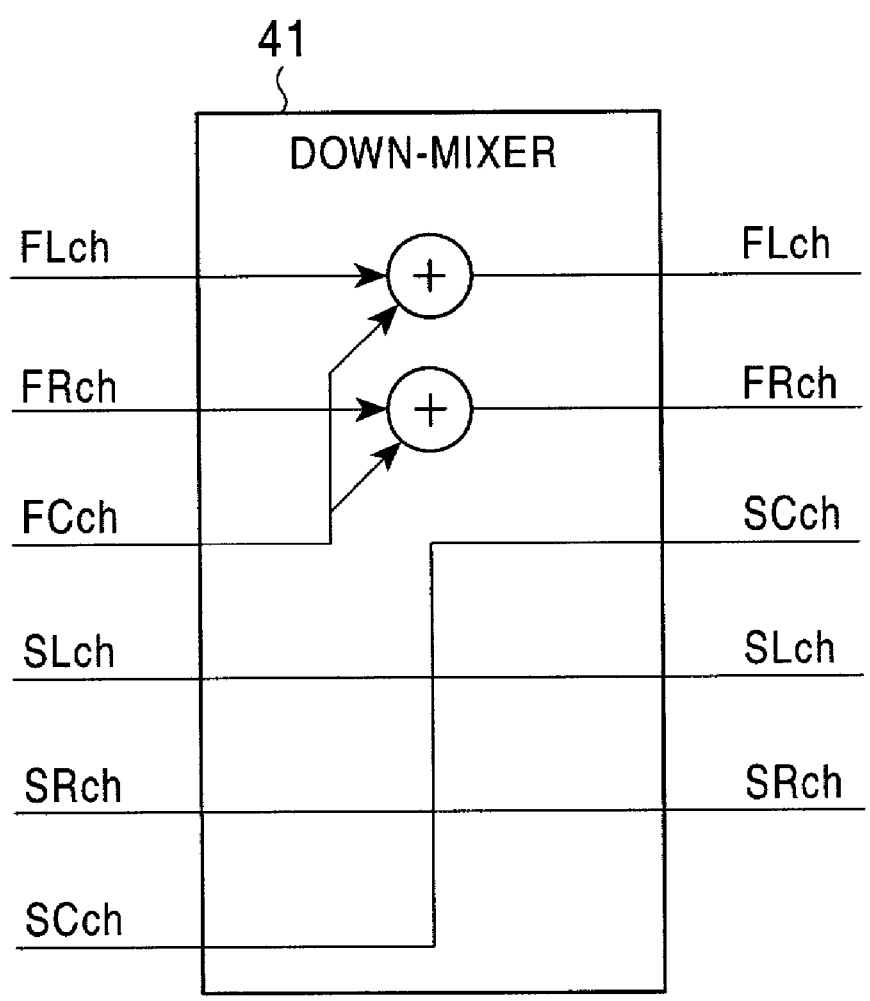
FIG. 4 shows the process of the down-mixer of the signal processor of the embodiment of the present invention.

The user may not install the speaker for the front center channel FCch but may install the speaker for the rear center channel SCch, and may connect the speaker of the rear center channel SCch to the output terminal 8c. As shown in FIG. 4, the controller 10 supplies the down-mixer 41 with a control signal for mixing the signal of the front center channel FCch of the input channels with each of the signal of the front left channel FLch and the signal of the front right channel FRch and for outputting the signal of the rear center channel SCch to the output channel (8c) which becomes available as a result of mixing. The down-mixer 41 outputs the five output channel signals as shown in FIG. 4.

Figure 5:
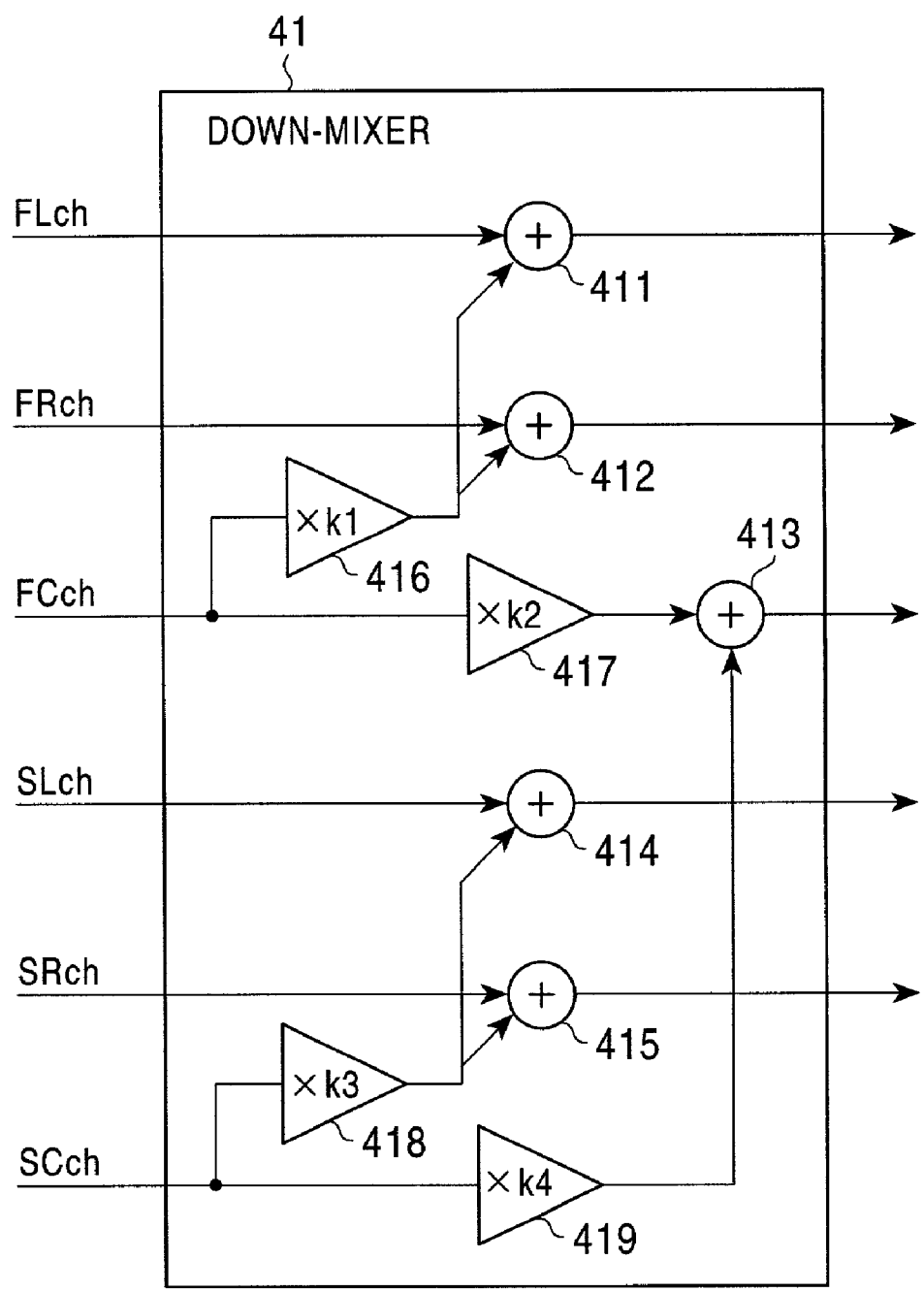
FIG. 5 shows an equivalent hardware structure of the down-mixer of the signal processor of the embodiment of the present invention.

FIG. 5 shows an equivalent hardware structure of the down-mixer 41 that incorporates the above three cases of speaker configuration. The control signal output from the controller 10 is now discussed.

Referring to FIG. 5, the signals of the input channels of the front left channel FLch, the front right channel FRch, the rear left channel SLch, and the rear right channel SRch respectively become output channel signals through adders 411, 412, 414, and 415.

The signal of the front center channel FCch of the input channels is supplied to the adder 413 through a coefficient multiplier 417 while being supplied to the adders 411 and 412 through a coefficient multiplier 416.

The signal of the rear center channel SCch of the input channels is supplied to the adder 413 through a coefficient multiplier 419 while being supplied to the adders 414 and 415 through a coefficient multiplier 418.

Now, k1, k2, k3, and k4 ($0 \leq$ k1, k2, k3, and k4 <1) respectively represent the coefficients of the coefficient multipliers 416, 417, 418, and 419 as shown in FIG. 5. The controller 10 supplies the down-mixer 41 with the coefficients k1, k2, k3, k4 as a control signal.

For example, when the down-mixer 41 performs the down-mixing process as shown in FIG. 2, the coefficients k1, k2, k3, and k4 are as follows:
k1=0,
k2=1,
k3=0.7, and
k4=0.

Further, when the down-mixer 41 performs the down-mixing process as shown in FIG. 3, the coefficients k1, k2, k3, and k4 are as follows:
k1=0.7,
k2=0,
k3=0.7, and
k4=0.

When the down-mixer 41 performs the down-mixing process as shown in FIG. 4, the coefficients k1, k2, k3, and k4 are as follows:
k1=0.7,
k2=0,
k3=0, and
k4=1.

Figure 6:
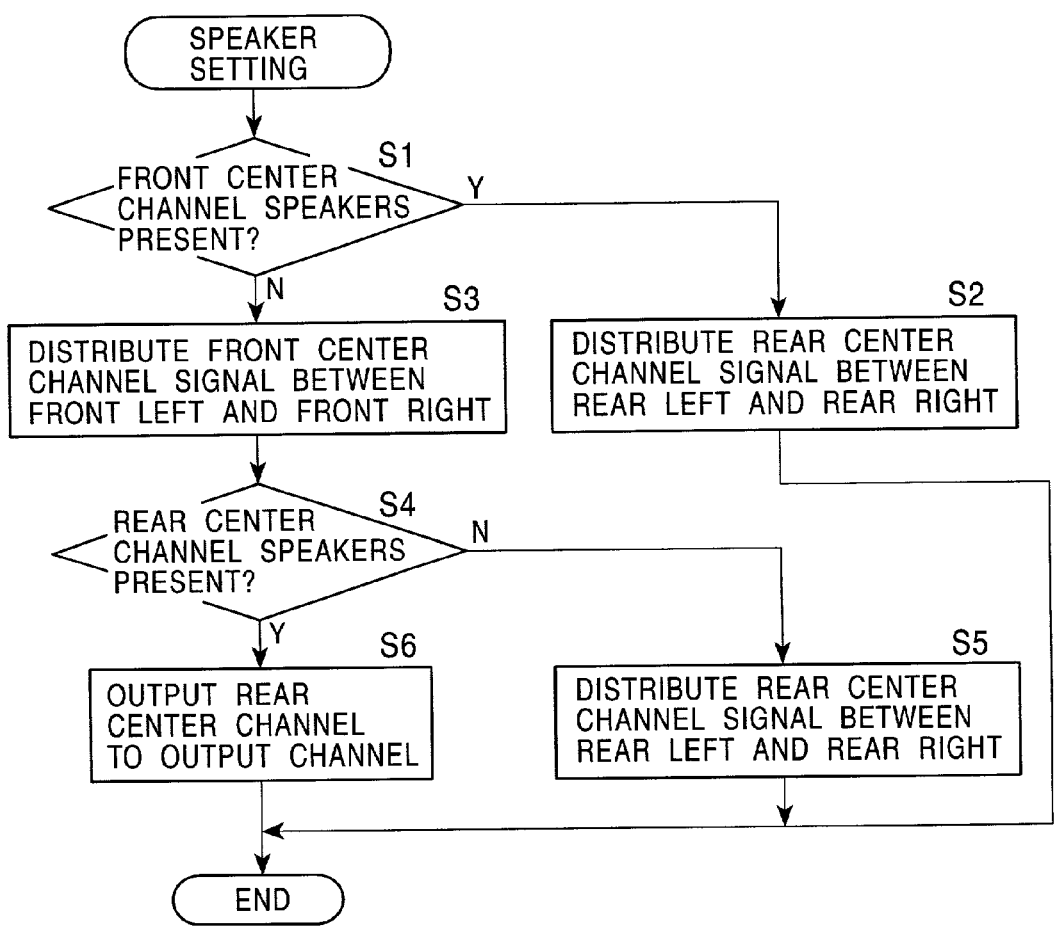
FIG. 6 is a flow diagram showing the operation of the embodiment of the present invention.

FIG. 6 shows a flow diagram of the software process of the controller 10 and the down-mixer 41 in which the above three cases of speaker configuration are implemented in the setup of the speakers.

The process routine shown in FIG. 6 starts when the user completes the entry of the setting information of the speaker installation at the setup of the speakers.

The controller 10 determines from the speaker setting information whether the speaker for the front center channel FCch is connected and/or installed (step S1). When it is determined that the speaker for the front center channel FCch is connected and/or installed, the controller 10 supplies the down-mixer 41 with the control signal for mixing the signal of the rear center channel SCch with each of the signal of the rear left channel SLch and the signal of the rear right channel SRch. The down-mixer 41 performs a step as commanded (step S2). The result of the step is shown in FIG. 2.

When it is determined in step S1 that no speaker has been connected to the front center channel FCch, the controller 10 supplies the down-mixer 41 with the control signal for mixing the signal of the front center channel FCch with each of the signal of the front left channel FLch and the signal of the front right channel FRch. The down-mixer 41 performs a step as commanded (step S3).

The controller 10 determines whether the speaker for the rear center channel SCch has been installed (step S4). When it is determined that no speaker has been installed, the controller 10 supplies the down-mixer 41 with the control signal for mixing the signal of the rear center channel SCch with each of the signal of the rear left channel SLch and the signal of the rear right channel SRch. The down-mixer 41 performs a step as commanded (step S5). The result of the step is shown in FIG. 3.

When it is determined in step S4 that a speaker has been connected and installed for the rear center channel SCch, the controller 10 supplies the down-mixer 41 with the control signal for outputting the signal of the rear center channel Scch to the output channel (output terminal 8c). The down-mixer 41 performs a step as commanded (step S6). The result of the step is shown in FIG. 4.

When the speaker setup is completed, the controller 10 and the signal processor 4 treat the output channels as the output channels newly defined in the setup, and then subject the output channel signals to the equalizing and balancing adjustments. The signals of the respective channels are then D/A converted, amplified by the respective power amplifiers, and output to the respective output terminals connected to the respective speakers.

In accordance with the present embodiment, the audio reproducing apparatus for performing reproduction compatible with the 6.1 channel multi-channel surround signals is provided simply by updating the firm ware of a microcomputer rather than by modifying the existing 5.1 channel surround hardware structure.

The number of design steps in the designing of the AV amplifier is thus reduced. Since there is no need for incorporating expensive high-power amplifiers for all input channels, component costs and assembly costs are reduced.

Power saving is promoted because power is cut off from the unused channels. Even if a 7.1 channel multi-channel surround audio format becomes available in the future, the apparatus will work with this format by simply modifying the software.

The down-mixing process of the down-mixer 41 discussed above is for illustrative purposes only, and the present invention is not limited to this down-mixing process.

The above embodiment has been discussed in connection with the 6.1 input channel surround system. The present invention is applied to a 7.1 channel (SDDS format) including front five channels and rear two channels, and a 7.1 channel system having a stereophonic rear center.

As described above, the present invention provides the audio reproducing apparatus that cope with an increase in the number of channels of the multi-channel surround system without the need for modifying the hardware thereof.

What is claimed is:

1. A multi-channel audio reproducing apparatus comprising:
    a decoder for decoding input audio signals in a predetermined multi-channel format having predetermined number (M) of channels;
    a predetermined number (N) of audio power amplifiers, the predetermined number (N) of audio power amplifiers being less than the predetermined number (M) of channels of input audio signals in the predetermined multi-channel format (M>N);
    user operation means for receiving user set-up information about a number (K) of speakers connected to said power amplifiers and placement thereof, the number (K) of speakers being less than the number (N) of audio power amplifiers;
    a signal processor arranged between said decoder and said power amplifiers for downmixing the predetermined number (M) of input audio signal channels and selecting output channels in accordance with the user set-up information such that the predetermined number (M) of input audio signal channels are produced on only K output channels corresponding to the K speakers; and
    a controller for controlling said signal processor in response to the user set-up information input by the said user operation means to output the predetermined number (M) of input audio signal channels on the (K) speakers.

2. The multi-channel audio reproducing apparatus according to claim 1, wherein said controller controls said signal processor in accordance with the user set-up information of the connection of a number of speakers, so that the decoder output of the input channel corresponding to the speaker which is determined to be unconnected is mixed with the decoder output of another input channel having the corresponding speaker thereof connected.

3. The multi-channel audio reproducing apparatus according to claim 1, wherein said controller controls said signal processor so that the input channel that is not present as an output of the decoder is mixed with the decoder output of another input channel and becomes available as a result of the downmixing.

4. A multi-channel audio reproducing apparatus comprising:
    a decoder for decoding input audio signals in a predetermined multi-channel format, having a predetermined number (M) of channels, one of which is a subwoofer channel;
    a plurality of audio power amplifiers of a number less than the predetermined number (M) of channels not including the subwoofer channel;
    a signal processor arranged between said decoder and said plurality of audio power amplifiers for receiving at input channels thereof all of the predetermined number (M) of channels in said multi-channel format from said decoder and for outputting at the output channels except the subwoofer channel in said multi-channel format from said decoder and for outputting at the output channels, thereof audio signals of a number of channels less than the number of input channels;
    user operation means for receiving user set-up information about the connection of a plurality of speakers to which outputs of said plurality of audio power amplifiers are respectively provided; and
    a controller for controlling said signal processor in response to the user set-up information received from said user operation means to provide a plurality of output signals equal in number to the number of speakers entered as set-up information by the user operation means.

5. The multi-channel audio reproducing apparatus according to claim 4, wherein said controller controls said signal processor so that the input channel that is not present at the output of the decoder is mixed with the decoder output of another input channel with the corresponding speaker thereof connected.

6. The multi-channel audio reproducing apparatus according to claim 4, wherein when said plurality of connected speakers is less in number than the plurality of audio power amplifiers, and a power supply to at least the power amplifier of the output channel to which no speaker is connected is cut off.

7. The multi-channel audio reproducing apparatus according to claim 1, wherein the predetermined number (M) of input audio channels includes at least front left, front center and front right audio channels and the signal processor downmixes the front center channel onto the front left channel and the front right channel.

8. The multi-channel audio reproducing apparatus according to claim 1, wherein the predetermined number (M) of input audio channels at least rear left, rear center and rear right audio channels and the signal processor downmixes the rear center channel onto the rear left channel and the rear right channel.

9. A multi-channel audio reproducing apparatus comprising:
    a decoder for decoding input audio signals in a predetermined multi-channel format, having a predetermined number (M) of channels, one of which is a subwoofer channel;
    a plurality of audio power amplifiers of a number less than the predetermined number (M) of channels not including the subwoofer channel;
    a signal processor arranged between said decoder and said plurality of audio power amplifiers for receiving at input channels thereof all of the predetermined number (M) of channels in said multi-channel format from said decoder and for outputting at the output channels except the subwoofer channel in said multi-channel format from said decoder and for outputting at the output channels, thereof audio signals of a number of channels less than the number of input channels;
    user operation interface for receiving user set-up information to selectively indicate which of said plurality of audio power amplifiers have speakers installed and the layout of the installed speakers; and
    a controller for controlling said signal processor in response to the user set-up information received from said user operation interface to provide a plurality of output signals based on the number and layout of the speakers entered as set-up information by the user operation means.

\* \* \* \* \*

UNITED STATES PATENT AND TRADEMARK OFFICE
CERTIFICATE OF CORRECTION

PATENT NO. : 7,206,648 B2
APPLICATION NO. : 09/875399
DATED : April 17, 2007
INVENTOR(S) : Kaneaki Fujishita Page 1 of 1

It is certified that error appears in the above-identified patent and that said Letters Patent is hereby corrected as shown below:

Column 9, line 18, after "channels" add -- includes --
Column 10, line 12, "thereof" should read -- thereof, --

Signed and Sealed this

Twenty-fourth Day of March, 2009

JOHN DOLL
*Acting Director of the United States Patent and Trademark Office*